UNITED STATES PATENT OFFICE.

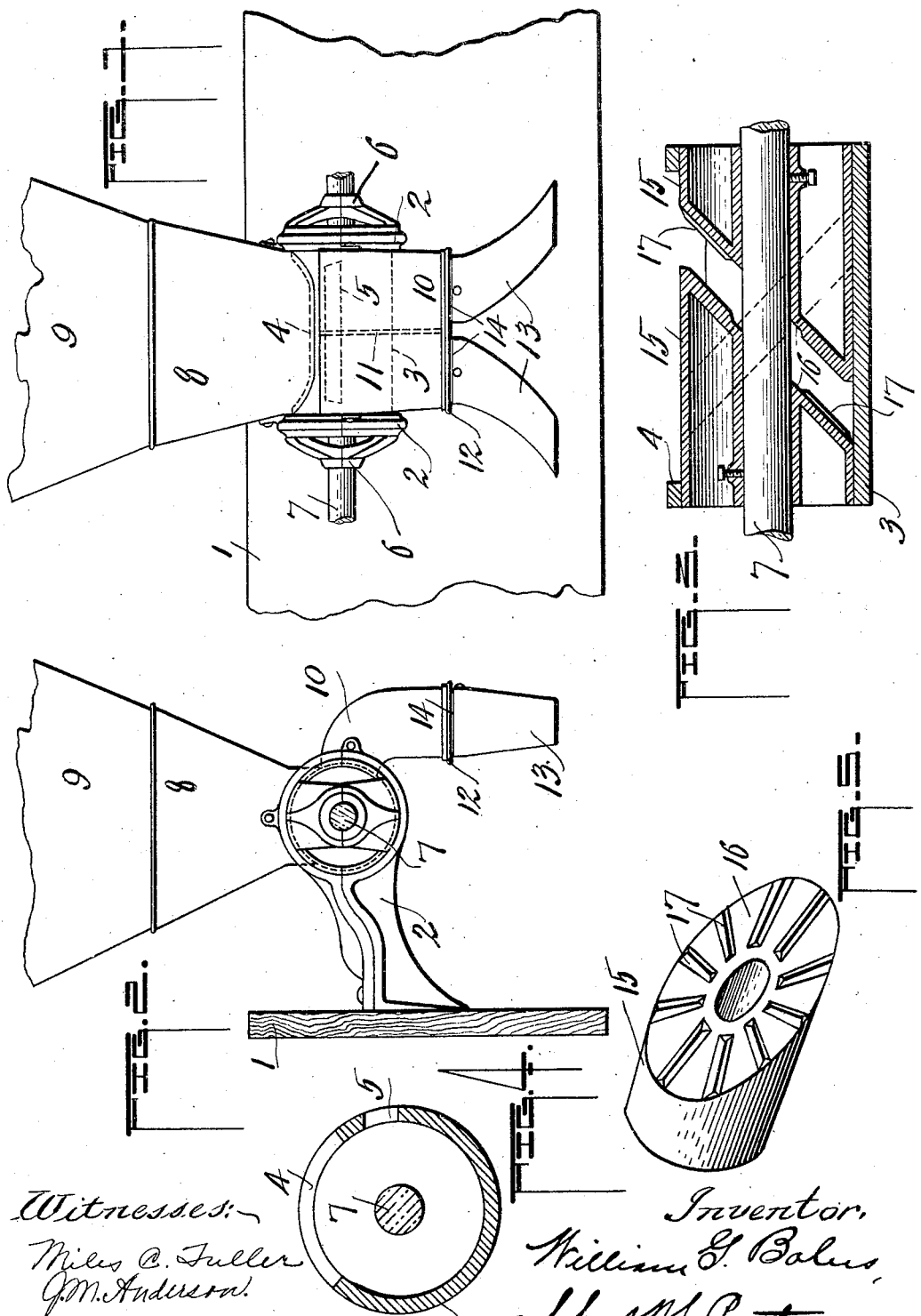

WILLIAM G. BOLUS, OF PEORIA, ILLINOIS, ASSIGNOR, BY DIRECT AND MESNE ASSIGNMENTS, TO HEARST FOUNDRY & MANUFACTURING COMPANY, A CORPORATION OF MAINE.

SEED-FEED DEVICE.

No. 877,547.   Specification of Letters Patent.   Patented Jan. 28, 1908.

Application filed May 29, 1906. Serial No. 319,240.

*To all whom it may concern:*

Be it known that I, WILLIAM G. BOLUS, a citizen of the United States, residing at Peoria, in the county of Peoria and State of Illinois, have invented certain new and useful Improvements in Seed-Feed Devices; and I do hereby declare that the following is a full, clear, and exact description of the invention, which will enable others skilled in the art to which it appertains to make and use the same.

This invention has reference to certain new and useful improvements in seed feeding devices, being particularly adapted to broadcast distributers as well as to grain drills and similar machines.

One of the objects of the present invention is a force-feeding device wherein the grain or seed is submitted to a reverse gyratory motion, during which movement it gradually finds its way to a suitable discharge opening to facilitate in its discharge upon or into the ground.

A further object of the invention consists in providing a tubular casing having a receiving and a discharge opening and in said casing is adjustably and revolubly carried two force-feeding members having matching inclined faces adapted to be spaced and held at suitable distances apart and provided with a series of lugs or ridges which serve as agitators. The grain or seed as it is received in the casing falls between the matching faces of the members and is moved back and forth in the casing as it is revolved about the axis of the shaft carrying said members, through the action of said members and agitators thereon, when it is gradually discharged through the discharge opening into suitable spouts or on to suitable fans to insure its being cast upon or into the ground.

For a further and full description of the invention herein and the merits thereof, and also to acquire a knowledge of the details of construction, of the means for affecting the result, reference is had to the following description and drawings hereto attached.

While the essential and characteristic features of the invention are susceptible of modification, still the preferred embodiment of the invention is illustrated in the accompanying drawings, in which:—

Figure 1 is an elevation of a broadcast distributing machine, omitting the fans and means of driving the same, and with my improvements attached thereto; Fig. 2 is a side elevation of the devices shown in Fig. 1; Fig. 3 is an enlarged longitudinal cross-section of the casing and force-feed members carried therein; Fig. 4 is an enlarged cross-section through the casing showing the arrangement of the receiving and discharge openings therein, and Fig. 5 is a perspective view of one of the force-feeding members.

Like numerals of reference indicate corresponding parts throughout the figures.

In the drawings, for convenience, the improvements herein are shown forming a part of that type of seed-distributing machine known as broadcast distributers, which employ spouts for receiving the grain or seed from the feeding devices and discharge the same onto distributer fans, although the latter have not been shown. If used they could be driven through suitable connection with the shaft carrying the feeding devices. However, it is understood that the feeding devices are applicable to various forms of seeding machines, such as grain drills and also to fertilizer distributers; and I do not wish to confine myself to the application of the devices as herein shown.

1 designates a portion of an endgate adapted to be secured to the rear of a wagon for supporting the seeding devices which are attached thereto. 2 denotes a pair of brackets, of any preferred construction, in which are secured the opposite ends of an elongated cylindrical casing 3, having the upper cut-out portion 4 serving as an inlet opening for grain or seed which is adapted to find its way into the said casing from a hopper above, and also the elongated discharge opening 5 in the front of the casing as shown, the lower walls of said last mentioned opening being parallel with the axis of the said cylinder.

The brackets 2 are each provided with bearings 6 in which is journaled and through which passes a driving shaft 7 adapted to derive its power from any suitable source and to transmit the same to force-feeding devices to be described carried on said shaft within the casing, and also to distributing fans if such are employed for sowing the grain or seed broadcast over a field.

8 denotes a hopper support, supported on the casing 3 above the opening or cut-out portion 4, and to the upper end of the hopper support is attached a hopper 9.

Attached to the casing and projecting outwardly and then downwardly is a spout 10 preferably divided throughout its length by means of the partition 11, shown in dotted lines in Fig. 1. The upper end of the spout 10 is preferably the width of the casing 3 between the brackets 2 and communicates with the discharge opening 5. The lower end of this spout is preferably secured in a plate 12 provided with openings (not shown) through which grain or seed passing down through the spout 10 upon the opposite sides of the partition 11 may find its way into a pair of spouts 13 which are preferably, adjustably secured to depending rings 14 from the plate 12. In Fig. 1 the spouts 13 diverge from their upper or secured ends, for the purpose of positioning their lower ends over fan distributers, not shown.

15 denotes a pair of force-feeding members, preferably duplicates of each other, which are carried within the casing 3 as shown in Fig. 3. They have smooth peripheral faces and inner matching faces 16 which are inclined at any suitable angle. It is adapted to adjustably carry the members 15 on the shaft 7 so as to regulate the distance at which their matching faces 16 may be spaced apart and thereby regulate and govern to a certain extent the amount of grain or seed to be discharged from the casing 3. On the matching faces 16 of the members 15 there is provided a series of agitators or lugs 17 which extend inwardly from the outer edges of the said members to a point near the openings through the same, adapted to pass the shaft 7 through.

In the operation of the machine, the shaft 7 being rotated imparts a corresponding movement to the members 15 which elevate the grain or seed in the casing 3 so as to enable it to be discharged through the opening 5 of the casing. The action of the inclined faces of the members 15 on the grain or seed is to impart to it a reverse gyratory movement, or in other words, a to and fro movement through the action of the respective members and cause a continuous stream to be discharged from the casing through opening 5 thereof. In fact the motion of the members 15 is such that the grain or seed in hopper support and hopper is constantly kept in motion, moving first in one direction and then in the opposite direction, insuring a perfect and uniform feed.

Having thus fully described my invention, what I claim and desire to secure by Letters Patent of the United States, is:—

1. A force-feeding device comprising two rotating members, each having acting faces in parallel spaced relation and arranged obliquely to their axis.

2. A force-feeding device, comprising two rotating members, each having acting faces in parallel spaced relation and arranged obliquely to their axis, and agitating lugs arranged on said oblique faces.

3. A force-feeding device comprising two rotating members having smooth peripheral faces, and provided with acting faces in parallel spaced relation and arranged obliquely to their axis.

4. A force-feeding device comprising two rotating members having smooth peripheral faces, provided with acting faces in parallel spaced relation and arranged obliquely to their axis and agitating lugs arranged on said oblique faces.

5. A force-feeding device comprising two rotating members adapted to be adjusted toward and from each other, each having acting faces in parallel spaced relation and arranged obliquely to their axis.

6. A force-feeding device comprising two rotating members adapted to be adjusted toward and from each other, each having acting faces in parallel spaced relation and arranged obliquely to their axis, and agitating lugs arranged on said oblique faces.

7. A force-feeding device comprising two rotating members adapted to be adjusted toward each other and having smooth peripheral faces, the matching ends of the members having acting faces in parallel spaced relation and arranged obliquely to their axis, and agitating lugs on said faces.

8. In combination, a shaft, a pair of rotating members adjustably carried on said shaft, the acting faces of the members being in parallel spaced relation and arranged obliquely to the axis of said shaft and provided with agitating lugs.

9. In combination, a cylindrical casing having inlet and discharge openings, a shaft passing through the casing, a pair of feeding members arranged in said casing upon the shaft aforesaid, the acting faces of the members being in parallel spaced relation and arranged obliquely to the axis of said shaft and provided with agitating lugs.

10. In combination, a cylindrical casing having inlet and discharge openings, a shaft passing through the casing, a pair of feeding members arranged in said casing upon the shaft aforesaid and adapted to be adjusted toward and from each other, the acting faces of the members being in parallel spaced relation and arranged obliquely to the axis of said shaft and provided with agitating lugs.

11. In combination, a casing having inlet and discharge openings, a pair of revoluble feeding members mounted in the casing and having acting faces arranged in parallel spaced relation and arranged obliquely to their axis, between which material finds its way when entering said casing, the rotation of the said members adapted to impart a reverse gyratory motion to said material and force it out of the discharge opening aforesaid.

12. In combination, a casing having inlet and discharge openings, a pair of revoluble feeding members mounted in the casing and having acting faces arranged in parallel spaced relation and arranged obliquely to their axis provided with agitating lugs projecting toward each other, between which material finds its way when entering said casing, the rotation of the said members adapted to impart a reverse gyratory motion to said material and force it out of the discharge opening aforesaid.

13. In combination, a casing having inlet and discharge openings, a hopper supported by the casing above the inlet opening therein, a feed-way leading from the casing and communicating with the discharge opening therein, and a pair of force-feeding members revolubly mounted in said casing, and provided with matching obliquely arranged inner ends.

14. In combination, a casing having inlet and discharge openings, a hopper supported by the casing above the inlet opening therein, and a pair of force-feeding members revolubly mounted in said casing and adapted to be adjusted toward and from each other to vary the distance between the same, the inner ends of said members extending across their axis in corresponding oblique lines and provided with agitating lugs.

15. In combination, a casing having an inlet opening in its top and an elongated discharge opening in its front face, a hopper supported by the casing above the inlet opening, a feed-way leading from the casing and communicating with the discharge opening aforesaid, a pair of revoluble feeding members mounted in the casing in axial alinement with each other, their inner acting ends arranged in parallel spaced relation and extending across their axis in corresponding oblique lines, and provided with agitating lugs.

16. A force-feeding device, comprising two axially arranged spaced members, their inner acting ends in parallel spaced relation and arranged obliquely to their axis, and provided with agitating means.

In testimony whereof I affix my signature, in presence of two witnesses.

WILLIAM G. BOLUS.

Witnesses:
  CHAS. W. LA PORTE,
  ROBT. N. MCCORMICK.